United States Patent
Shimonishi (10) Patent No.: US 6,330,223 B1
(45) Date of Patent: Dec. 11, 2001

(54) WEIGHED ROUND-ROBIN MULTIPLEXING OF ATM CELLS BY UPDATING WEIGHTS WITH COUNTER OUTPUTS

(75) Inventor: Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/003,243

(22) Filed: Jan. 6, 1998

(30) Foreign Application Priority Data

Jan. 7, 1997 (JP) .................................................. 9-000794

(51) Int. Cl.$^7$ ................................. H04L 12/56; H04J 3/16
(52) U.S. Cl. .................... 370/230; 370/412; 370/428; 370/468
(58) Field of Search .................................... 370/229, 230, 370/231, 235, 395, 396, 397, 400, 409, 412–418, 468, 465, 537, 538, 428, 429

(56) References Cited

U.S. PATENT DOCUMENTS

| | | | | |
|---|---|---|---|---|
| 5,499,238 | * | 3/1996 | Shon ..................................... | 370/399 |
| 5,561,663 | * | 10/1996 | Klausmeier ........................... | 370/412 |
| 5,732,087 | * | 3/1998 | Lauer et al. .......................... | 370/416 |
| 5,771,234 | * | 6/1998 | Wu et al. .............................. | 370/396 |
| 6,034,960 | * | 3/2000 | Beshai et al. ......................... | 370/395 |
| 6,069,893 | * | 5/2000 | Parruck et al. ....................... | 370/395 |

OTHER PUBLICATIONS

M. Katevenis, et al., "Weighted Round–Robin Cell Multiplexing in a General–Purpose ATM Switch Chip", *IEEE Journal on Selected Areas in Communications*, vol. 9, No. 8, Oct. 1991, pp. 1265–1279.

* cited by examiner

*Primary Examiner*—Chau Nguyen
*Assistant Examiner*—Soon-Dong Hyun
(74) *Attorney, Agent, or Firm*—Ostrolenk, Faber, Gerb & Soffen, LLP (57) ABSTRACT

In an ATM network node, cells of different service classes are stored in respective buffers and counters respectively associated with the buffers are initially loaded with full-count values respectively corresponding to the weight values of the service classes. The initial full-count values are updated respectively with the output values of the associated counters. Control circuitry sequentially interrogates the buffers and the counters in a round-robin fashion. If the output value of each interrogated counter is not decremented to a predetermined value, a cell is forwarded from the associated buffer and the counter is decremented by one. At the end of a round robin cycle, all of the counters are reloaded with the initial full-count values or the updated full-count values depending on the number of cells forwarded from each of the buffers.

31 Claims, 6 Drawing Sheets

WEIGHED ROUND-ROBIN MULTIPLEXING OF ATM CELLS BY UPDATING WEIGHTS WITH COUNTER OUTPUTS

BACKGROUND OF THE INVENTION

1. Field of the Invention

The present invention relates generally to asynchronous transfer mode (ATM) networks, and more specifically to an ATM network node wherein a plurality of servers of different classes are examined in a round robin fashion to forward buffered cells according to the frequency weights allocated to their service classes.

2. Description of the Related Art

Weighted round-robin cell multiplexing is described in a paper titled "Weighted Round-Robin Cell Multiplexing in a General-Purpose ATM Switch Chip", Manolis Katevenis et al., IEEE Journal on Selected Areas in Communications, Vol 9, No. 8, October 1991, pages 1265 to 1279. According to this prior art, ATM Cells of different traffic (or service class) are stored in corresponding buffers and counters are associated respectively with the buffers. Different values of frequency weights are loaded into the counters corresponding to the service classes. In a round-robin fashion, a cell is forwarded from each buffer until the associated counter is decremented to zero. At the end of a round robin cycle, all the counters are reset and the frequency weights are reloaded into the counters to begin a new cycle.

However, the arrival of cells in a rapid succession would form a queue in a buffer if the other buffers are also receiving rapidly arriving cells. When this occurs, the counter is decremented to zero and the stored cells must wait for their turn until the next round robin cycle begins. If these cells are of the type which must be processed on a real-time basis, delays caused by the weighted round robin multiplexing cannot be ignored.

SUMMARY OF THE INVENTION

It is therefore an object of the present invention to provide an ATM network node wherein cells are multiplexed on a weighted round-robin fashion with reduced delays for cells arriving at short time intervals.

According to a first broader aspect of the present invention, there is provided an ATM network node which comprises a plurality of buffers for respectively storing cells of different service classes and a plurality of counters respectively associated with the buffers, the counters being initially loaded with initial weight values respectively corresponding to the service classes. Updating circuitry is provided for respectively updating the initial count values with output values of the counters. Control circuitry sequentially interrogates the buffers and the counters in a round-robin fashion. If the output value of each interrogated counter is not decremented to a predetermined value, a cell is forwarded from the associated buffer and the counter is decremented by one. At the end of a round robin cycle, all of the counters are reloaded with the initial count values of the updated count values depending on the number of cells forwarded from each of the buffers.

According to a first specific aspect, the updated count values are smaller than the initial count values by amounts corresponding to negative output values of the counters.

According to a second specific aspect, the updated count values are respectively greater than the initial count values by amounts corresponding to positive output values of the counters but respectively smaller than predetermined upper limit values.

According to a third specific aspect, the updated count values are respectively smaller than the initial count values by amounts corresponding to negative output values of the counters or respectively greater than the initial count values by amounts corresponding to positive output values of the counters but respectively smaller than predetermined upper limit values.

According to a second broader aspect, the present invention provides a method for an ATM network node which comprises a plurality of buffers for respectively storing cells of different service classes, and a plurality of counters respectively associated with the buffers, the counters being initially loaded with full-count values respectively corresponding to the service classes. The method comprises the steps of (a) determining whether the output value of a successive one of the counters is not decremented to a predetermined count value, (b) if the counter is not decremented to the predetermined count value, causing the buffet associated with the counter to forward a cell and decrementing the counter by one, (c) updating the full-count value of the counter with an output value thereof, (d) repeating the steps (a) to (c) in a round robin fashion, and (e) reloading each of the counters with the initial weight or the updated weight at the end of a round robin cycle depending on the number of cells forwarded from the buffer associated with the counter.

According to a third broader aspect, the present invention provides a method for an ATM network node which comprises a plurality of buffers for respectively storing cells, and a plurality of counters of different service classes respectively associated with the buffers, the counters being initially loaded with respective full-count values corresponding to weight values of the service classes, wherein each of the counters produces a first indication when the counter is decremented to a predetermined value and each of the buffers produces a second indication when there is no cell to transmit. The method comprisies comprises the steps of (a) setting a counter-pointing variable "i" to one, and (b) making an affirmative decision when the counter pointed by variable "i" is producing the first indication or the buffer associated with the counter is producing the second indication or a negative decision when both of the counter and the associated buffer are not producing the respective indications. If the decision at step (b) is negative, step (c) is performed by forwarding a cell from the associated buffer, decrementing the counter by one and updating the full-count value with an output value of the counter. Decision step (d) is then performed: If, in each of the service classes, the counter is producing the first indication or the buffer is producing the second indication, all of the counters are reloaded with thin initial full-count values or the updated full-count values of the counters depending on the number of cells forwarded from the buffers associated with the counters. If, in at least one of the service classes, both of the counter and the buffer are not producing the respective indications, the variable "i" is incremented by one and the step (b) and those that follow are repeated. If the decision at step (b) is affirmative, decision step (d) and those that follow are repeated.

Step (c) may further include the step of resetting the variable "i" to zero. With the variable resetting step, cells of higher priority levels are forwarded preferentially over those of lower priority levels.

BRIEF DESCRIPTION OF THE DRAWINGS

The present invention will be described in further detail with reference to the accompanying drawings, in which.

DETAILED DESCRIPTION

Figure 1:
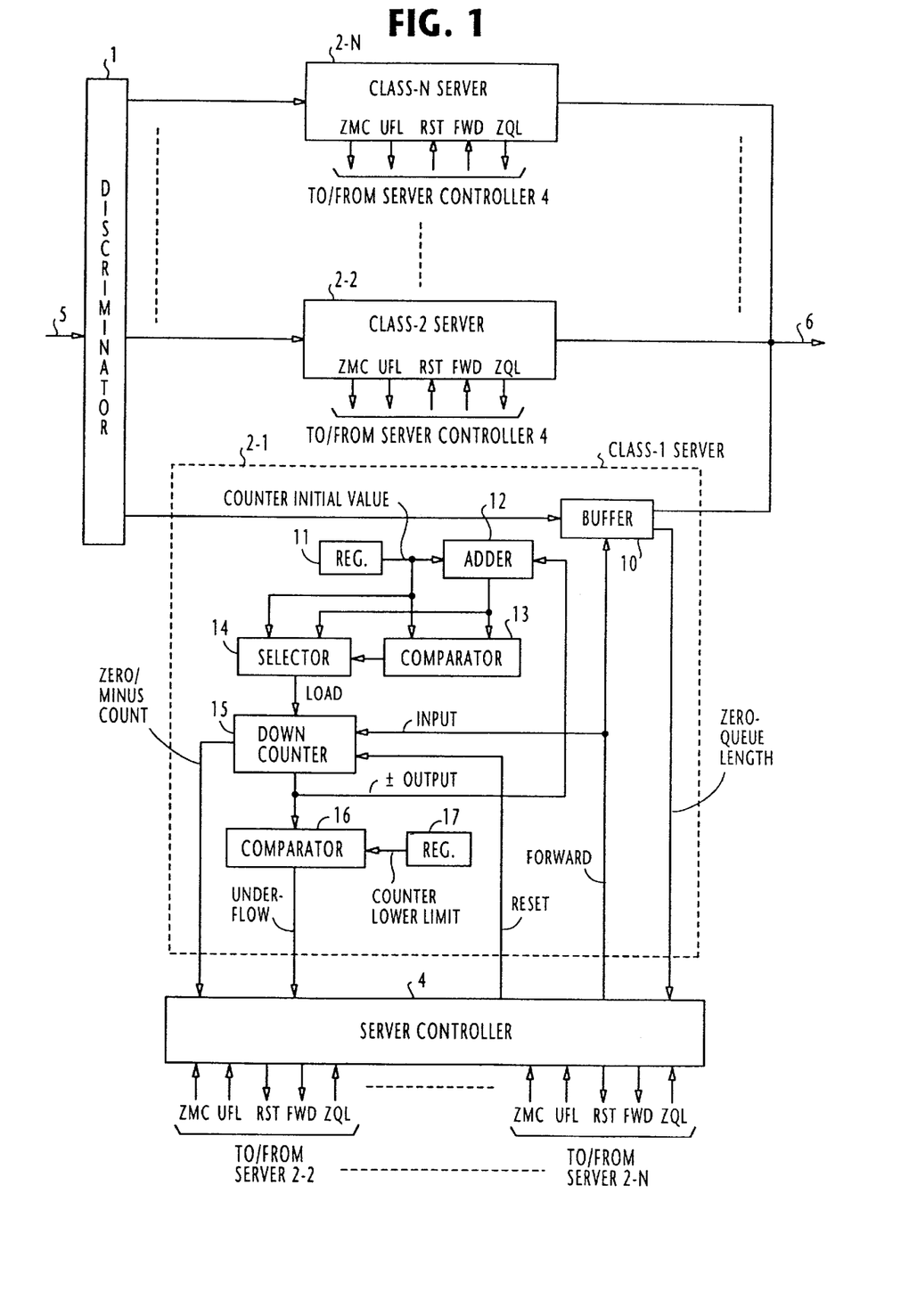
FIG. 1 is a block diagram of an ATM network node according to a first embodiment of the present invention.

In FIG. 1, there is shown an ATM network node according to a first embodiment of the present invention. The network node has a discriminator 1 which examines the header of an incoming packet, or 53-byte ATM cell from an input line 5 and distributes it to a corresponding one of a plurality of identical servers 2-1 through 2-N respectively identified as class-1 to class-N servers.

Each server, as represented by server 2-1, comprises a buffer 10 for receiving class-1 ATM cells from the discriminator 1 to form a queue, waiting for their turn to be forwarded onto an output line 6 in response to a forward command signal from the server controller 4. Initially, the server controller 4 resets all servers 2. In response, a down counter 15 is loaded with the output of a selector 14 which is initially set equal to a counter initial value stored in a register 11. The initial count value of each server is the "frequency weight" of the server and corresponds to the service class of the server. Thus, it differs from one server to another.

The initial count value loaded into counter 15 is decremented by 1 in response to the output command signal from the server controller 4 so that each time a cell is delivered from the buffer 10 the loaded value is decremented by 1. If the number of the forwarded cells exceeds the initial count value, a zero/minus count indication is produced by the counter 15. If that number further increases, the counter 15 produces a negative count value, and this negative value is summed with the initial value of register 11 by adder 12. Therefore, the output of adder 12 will become smaller than the initial count value and maintained by selector 14 if the number of forwarded cells exceeds the initial count value. When the counter 15 is reset again, it will be loaded with a count value which is smaller than the initial count value by an amount corresponding to the number of cells forwarded after the initial count value is decremented to zero. When the buffer 10 is empty, it supplies a zero-queue length indication to the server controller 4.

The output of counter 15 is supplied to an adder 12 where it is summed with the ouput of register 11. The outputs of register 11 and adder 12 are compared with each other in a comparator 13 and one of these having a smaller magnitude is determined. Selector 14 is responsive to the output of comparator 13 for selecting the smaller of the outputs of register 11 and adder 12. As long as the down counter 15 produces and output of positive value, the output of selector 14 equals the output of register 11. The output of counter 15 is further compared by a comparator 16 with a counter lower limit of negative value stored in a register 17. Comparator 16 supplies an underflow signal to the server controller 4 when the negative output value of down counter 15 becomes equal to the negative lower limit value of register 17.

As will be understood, the underflow signal from a server prevents the server controller 4 from further supplying the forward command signal to that server when it has forwarded a predetermined number of cells after its initial count (i.e., weight) value has been decremented to zero.

The operation of the server controller 4 will be described below with the aid of a flowchart shown in FIG. 2. Initially, server controller 4 supplies a reset signal to all servers 2-1 to 2-N, so that their down counters are loaded with initial frequency weights. At step 31, a variable "i", representing the service class, is set equal to 1. Flow proceeds to decision step 32 to determine whether an underflow or zero-queue length indication is received from the class-i server.

The server controller makes an affirmative decision when the counter pointed by variable "i" is producing an underflow indication or the buffer associated with this counter is producing a zero-queue length indication and makes a negative decision when both of the counter and the associated buffer are not producing the respective indications.

If the decision at step 32 is negative, server controller 4 commands the class-i server to forward a cell from its buffer onto the output line 6 at cell transmit timing (steps 33, 34), and proceeds to step 35. If the decision at step 32 is affirmative, cell transmission from this server is not performed at steps 33 and 34 and controller 4 proceeds to step 35.

Meanwhile, the full-count value maintained by the selector 14 is updated with the current output value of the counter (FIG. 1).

As step 35, the controller checks for the presence of a zero/minus count indication or zero-queue length indication from all servers. If either one of zero/minus count or zero-queue length indications is received from all servers. The server controller makes an affirmative decision when, in each of the service classes, the count is producing a zero/minus count indication or the buffer is producing a zero-queue length indication and makes a negative decision when, in at least one of the service classes, both of the counter and the buffer are not producing the respective indications.

If the decision at step 35 is affirmative, flow returns to step 30 to reset the counters 15 of all servers so that they are reloaded with individual full-count values currently maintained at the output of their selectors 14, whereupon the server controller completes a round robin cycle.

If the decision at step 35 is negative, flow proceeds to step 36 to check to see if the variable "i" is equal to N. If i≠N, the variable is incremented by one at step 37 and if i=N it is set equal to one at step 38. Following the execution of either step 37 or 38, control returns to step 32 to repeat the process.

If the number of cells forwarded from a given server becomes greater than its full-count value initially given by register 11, the output of adder 12 becomes smaller than this full-count value by an amount equal to the number of cells excessively (additionally) forwarded after the counter 15 is decremented to zero. Therefore, when counter 15 is reset, it is reloaded with a new full-count value which is smaller than the initial weight by an amount corresponding to the number of such excessively forwarded cells. Since some of the servers might have forwarded such excessive cells when the counters 15 of all servers are reset in response to an affirmative decision at step 35, the full-count values of such servers will be updated to smaller-than-the-initial full-count values and a new cycle begins with the updated values.

In this way, the present invention allows servers to forward cells more than their weight values if they arrive in rapid succession. Therefore, the cells of the type requiring real-time processing are delivered to the output line without delays.

Figure 3:
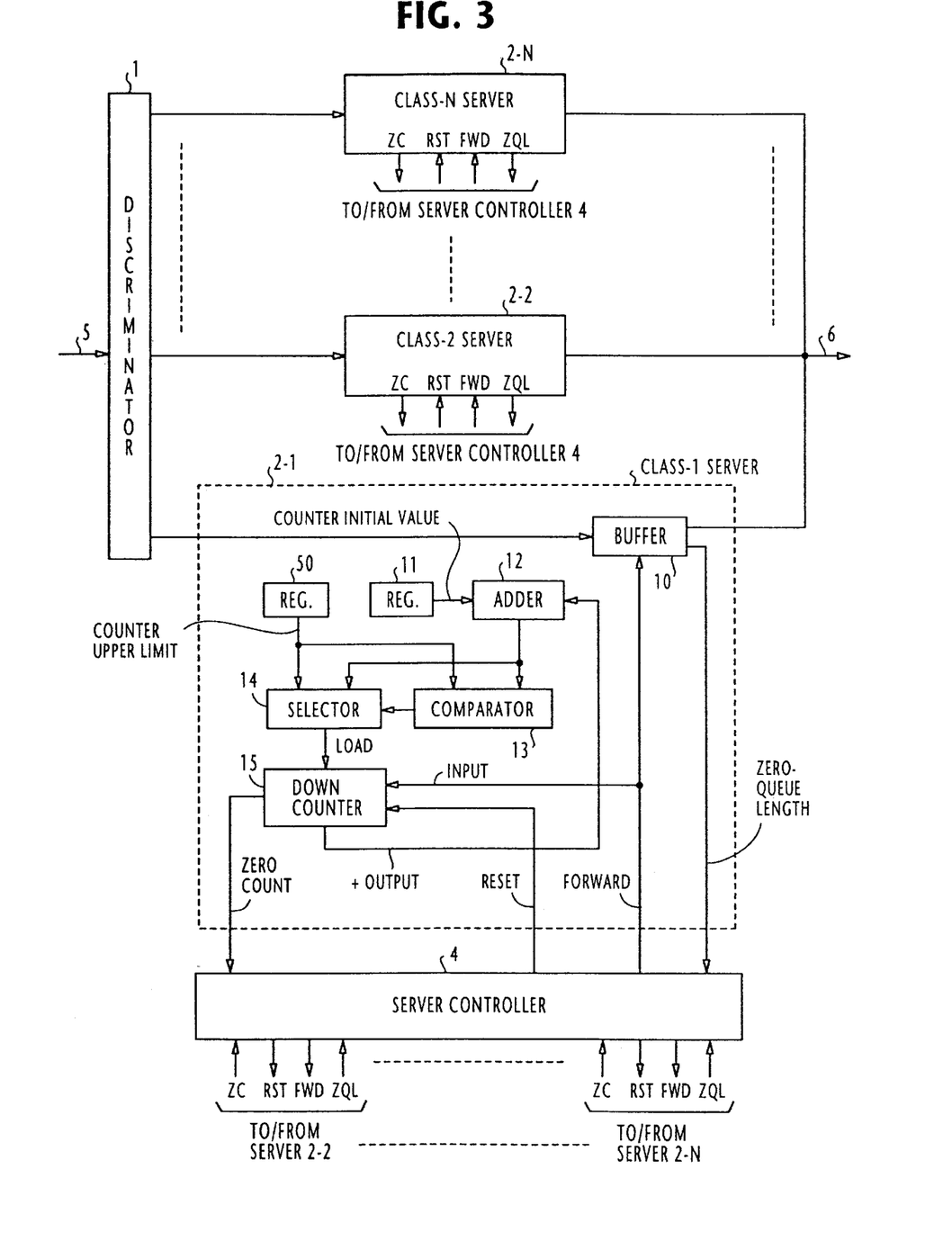
FIG. 3 is a block diagram of an ATM network node according to a second embodiment of the present invention.
Figure 4:
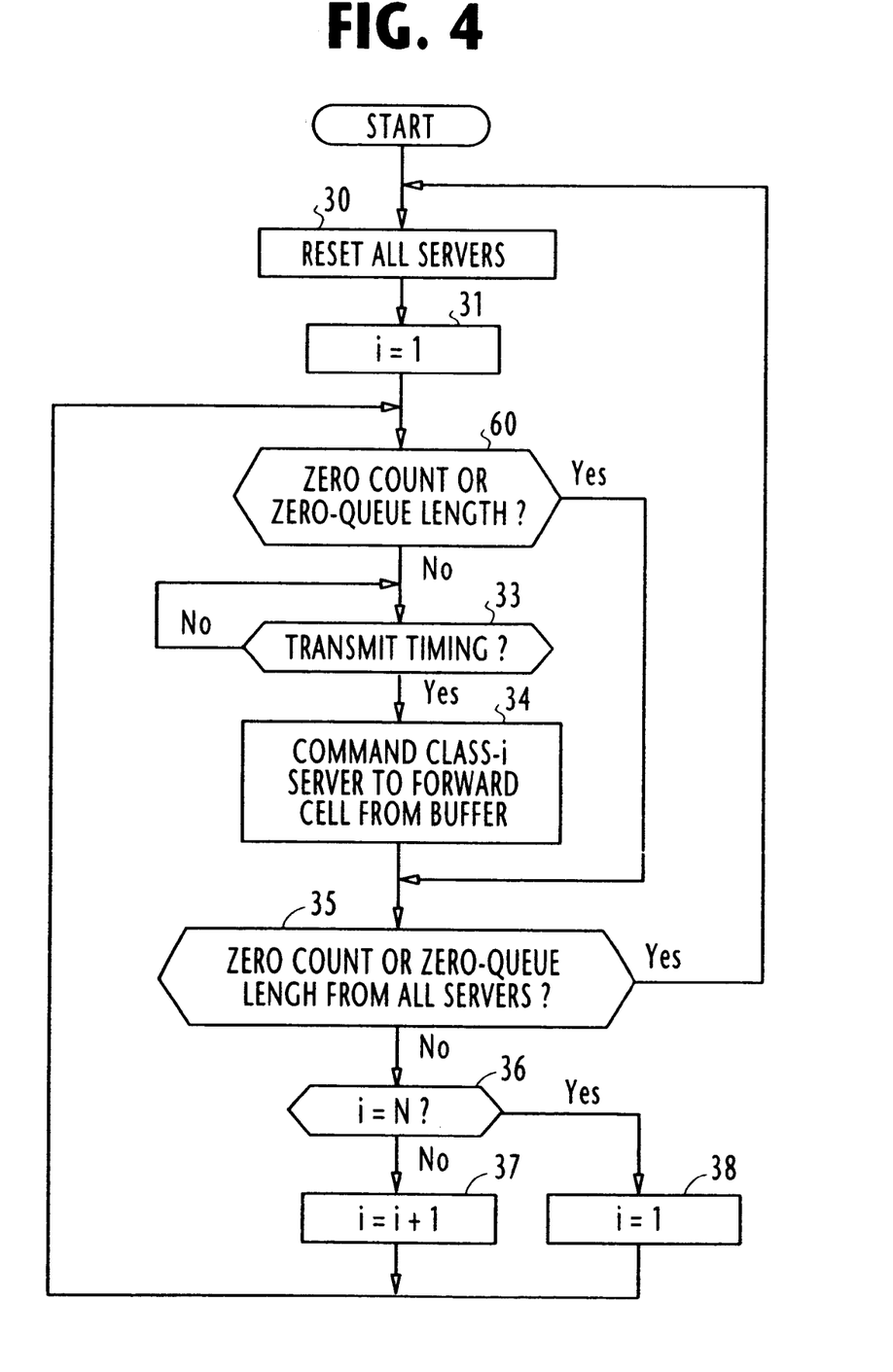
FIG. 4 is a flowchart of the operation of the controller FIG. 3.

A second embodiment of this invention is shown in FIGS. 3 and 4. In this embodiment, the down count value of a server obtained at the instant it is reset is used as a "saved" value during the next cycle to allow this server to increase the number of cells to be forwarded by that amount. In FIG. 3, each server includes a register 50 to supply a counter upper limit value to the selector 14 and comparison is made between the upper limit value and the output of adder 12 to determine the smaller of these values. Selector 14 selects this smaller value according to the output of comparator 13. The upper limit values are appropriately determined for individual servers. The upper limit value of each server is greater than the initial full-count (i.e., weight) value of the server.

It is seen that the comparator 16 of FIG. 1 is dispensed with. Therefore, step 60 is provided instead of step 32 of FIG. 2, as shown in FIG. 4, in order to skip cell transmission steps 33 and 34 when the down counter produces a zero count indication. The output of down counter 15 is thus equal to or greater than zero. This count value is supplied to the adder 12. When the counter 15 is reset, the positive output count value obtained at this instant is summed with the initial full-count value of the server and compared with the upper limit value.

Assume that the initial full-count (or weight of the service class) value of the server is "10" and the counter 15 has been decremented to "2" at the reset instant, and the upper limit value is equal to "14". Under these circumstances, the output of the adder is selected and loaded into the down counter 15 to be used as an updated full-count value. Thus, in the next cycle, the server is allowed to forward two cells more than the initial full-count value of "10".

It is seen therefore that the counter upper limit value will be selected if the "saved" value of a given cycle is unusually larger. This prevents the server from forwarding an exceedingly large number of cells during the next cycle.

Figure 5:
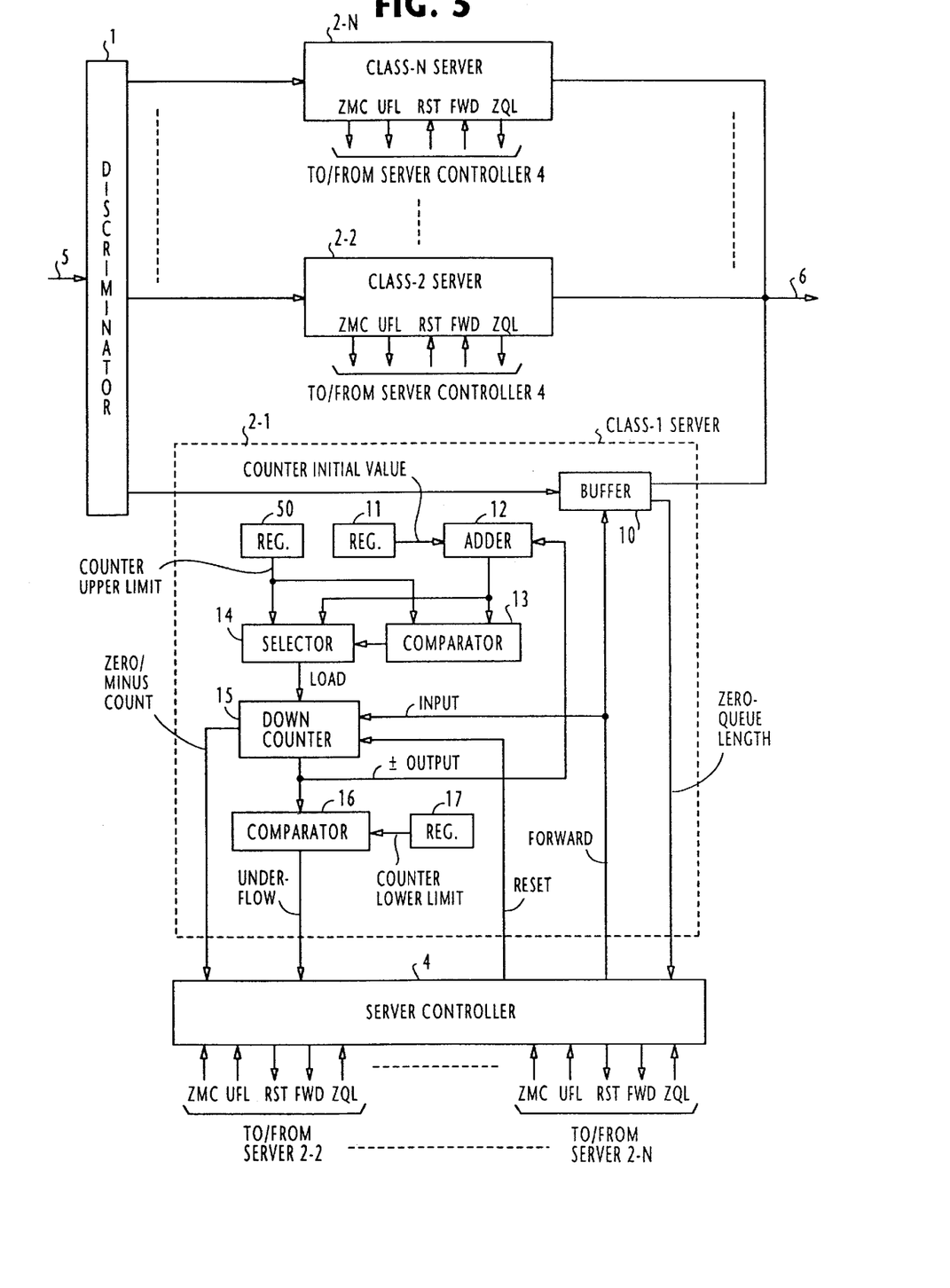
FIG. 5 is a block diagram of an ATM network node according to a third embodiment of the present invention.

The "saving" feature of the second embodiment can be advantageously combined with the "underflow" feature of the first embodiment as shown in FIG. 5, wherein parts corresponding in significance to those of FIGS. 1 and 3 are marked with the same numerals as used in FIGS. 1 and 3. The server controller 4 of this modified embodiment operates in the same manner as the controller of FIG. 1 by using the flowchart of FIG. 2.

If the number of cells forwarded from a server in a given cycle exceeds the weight, or initial full-count value of the server, the server controller 4 allows it to continue forwarding cells as long as the decremented count value is higher than the lower limit of register 17. If the number of cells received during the previous cycle is unusually small, the down counter 15 has been loaded with a relatively high count value due the the "saved" count of the previous cycle. Therefore, this modified embodiment has an averaging effect over successive cycles, so that a rapid increase in the number of arriving cells can be compensated for by the combined "saving" and "underflow" features of this invention.

Figure 2:
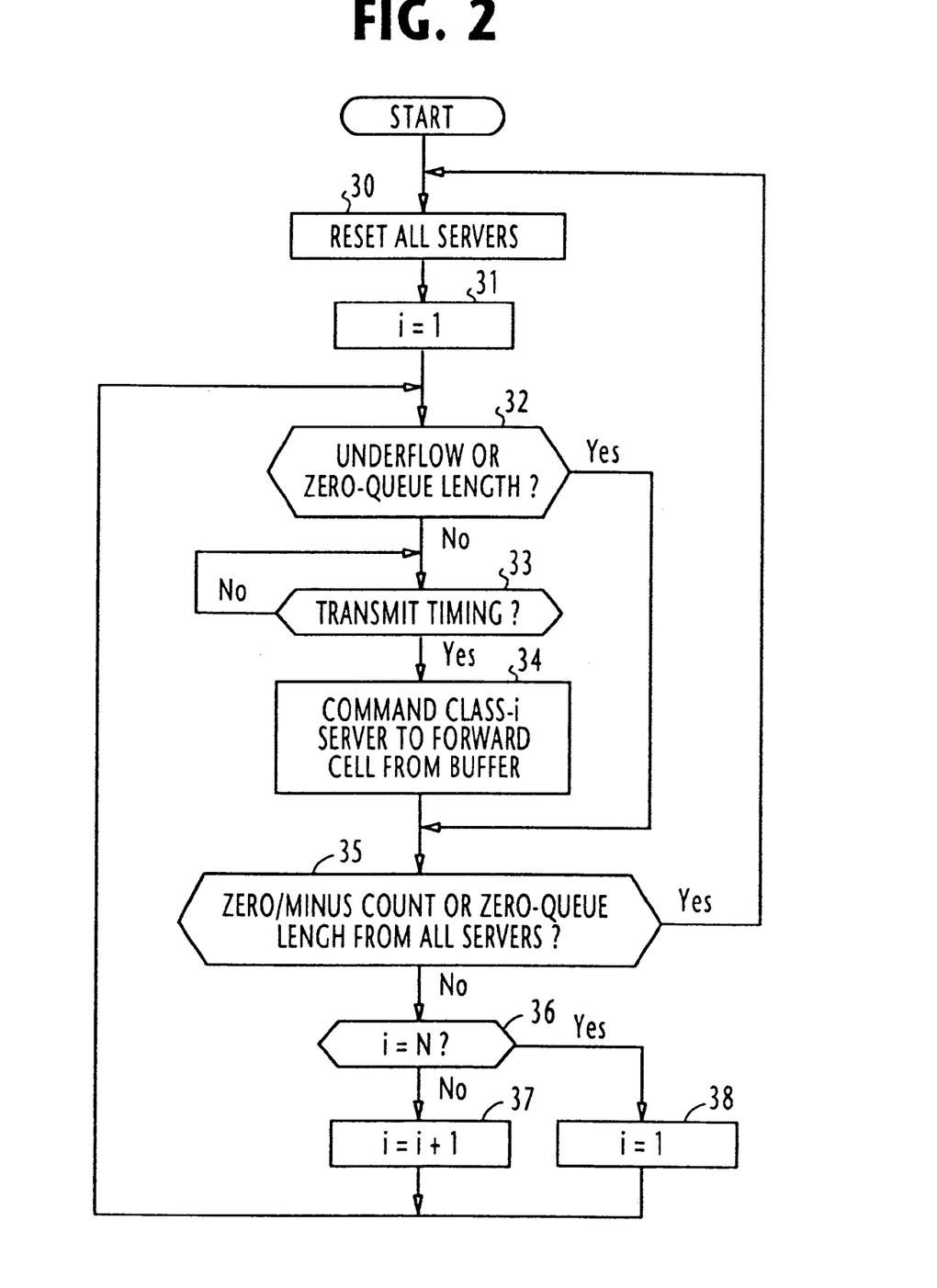
FIG. 2 is a flowchart of the operation of the controller of FIG. 1.
Figure 6:
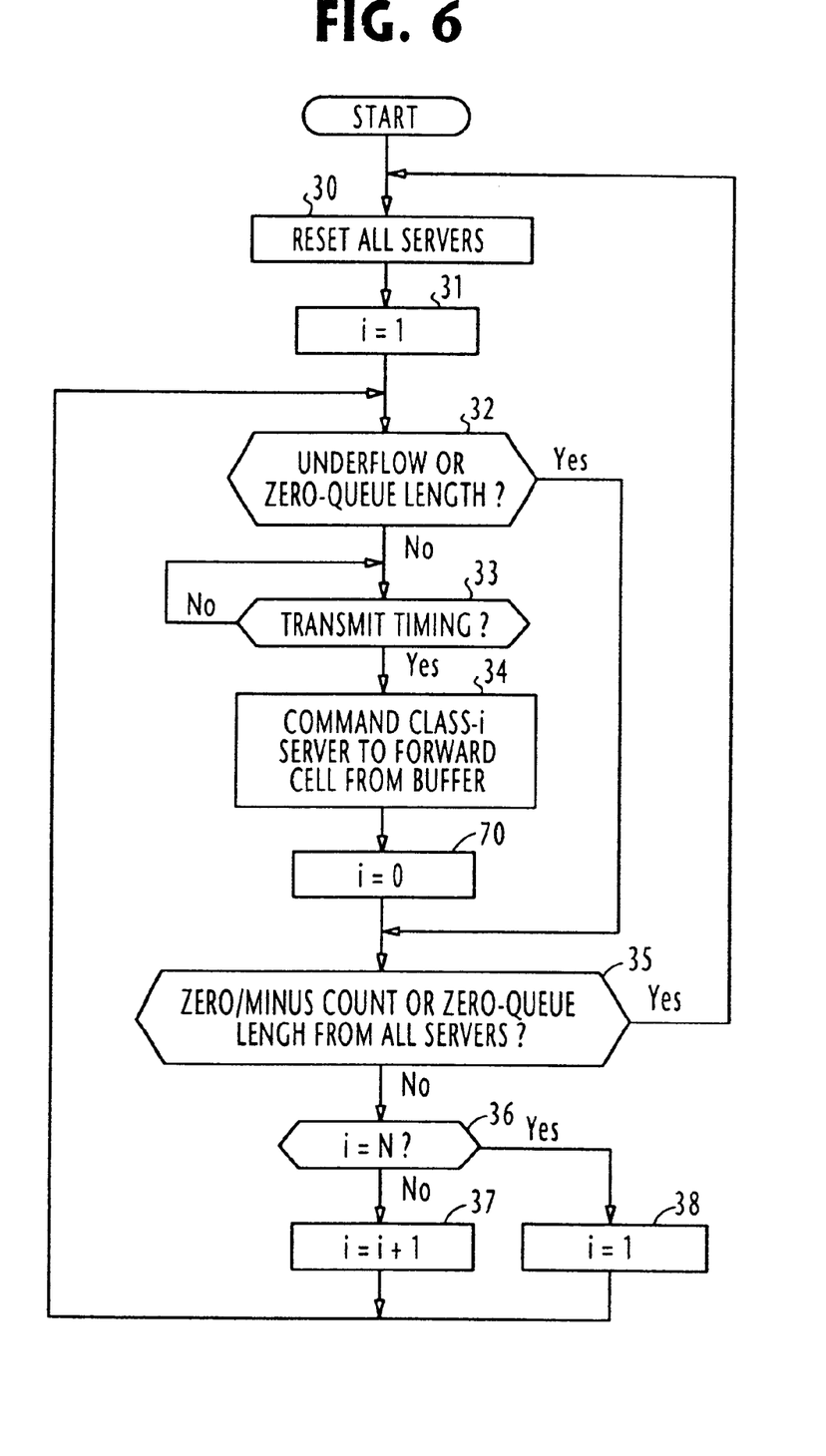
FIG. 6 is a flowchart of the operation of the controller of FIG. 1 according to a fourth embodiment of the present invention.

FIG. 6 illustrates a flowchart of the operation of the server controller of FIG. 1 according to a further embodiment of the present invention in which parts corresponding in significance to those of FIG. 2 are marked with the same numerals as used in FIG. 2. FIG. 6 differs from FIG. 2 in that it additionally includes step 70 following step 34 to reset the variable "i" to zero. Following the execution of step 70 or the affirmative decision of step 32, control proceeds to decision step 35. The provision of the variable-resetting step 70 causes the server controller to increment the variable "i" to "1" at step 37 provided that the decision at step 35 is negative. Thus, steps 32 to 34 are repeated on the class-1 server 2-1 if it has a cell to transmit. Assume that class-1 to class-N servers are given priority of different levels with the class-1 server being the highest and the class-N server being the lowest. Therefore, as long as the class-1 server has at least one cell to transmit at the instant the variable "i" is incremented to "1" at step 37, the decision at step 32 is negative and the cell of the highest priority is forwarded (steps 33, 34). If the class-1 server has no more cells to transmit, the decision at step 32 is affirmative and the variable "i" is incremented to "2" at step 37 to repeat steps 32 to 34 on the class-2 server. Thus, as long as the class-2 server has at least one cell to transmit at the instant the variable "i" is incremented to "2", the decision at step 32 is negative and the cell of the second highest priority is forwarded (steps 33, 34). If the class-2 server has no more cells to transmit, the decision at step 32 is affirmative and the variable "i" is incremented to "3" to repeat steps 32 to 34 on the class-3 server.

Therefore, higher priority cells are forwarded with smaller delays than lower priority cells.

While it is shown that the variable resetting step is combined with the flowchart of FIG 2, it could equally be as well combined with the flowchart of FIG. 4.

What is claimed is:

1. An ATM network node comprising:

a plurality of buffers for respectively storing cells of different service classes having respective weight values;

a plurality of counters respectively associated with the buffers, the counters being initially loaded with full-count values respectively corresponding to the respective weight values of the service classes;

counter updating circuitry for updating the full-count values respectively with output values of the counters; and control circuitry for sequentially interrogating the buffers and the counters in a round-robin fashion and forwarding a cell from each interrogated buffer and decrementing each interrogated counter by one if the output value of the counter is not decremented to a predetermined value, and reloading all of the counters with the initial full-count values or the updated full-count values at the end of a round robin sequence depending on the number of cells forwarded from each of the buffers, the updated full-count values being smaller than the weight values by amounts corresponding to negative output values of the counters.

2. An ATM network node comprising:

a plurality of buffers for respectively storing cells of different service classes having respective weight values;

a plurality of counters respectively associated with the buffers, the counters being initially loaded with full-count values respectively corresponding to the respective weight values of the service classes;

counter updating circuitry for updating the full-count values respectively with output values of the counters; and control circuitry for sequentially interrogating the buffers and the counters in a round-robin fashion and forwarding a cell from each interrogated buffer and decrementing each interrogated counter by one if the output value of the counter is not decremented to a predetermined value, and reloading all of the counters with the initial full-count values or the updated full-count values at the end of a round robin sequence depending on the number of cells forwarded from each of the buffers, the updated full-count values being respectively greater than the weight values by amounts corresponding to positive output values of the counters but respectively smaller than predetermined upper limit values.

3. An ATM network node as claimed in claim 2, wherein the updated full-count values are respectively smaller than the weight values by amounts corresponding to negative output values of the counters.

4. An ATM network node comprising:
a plurality of servers for respectively receiving cells of different service classes, the servers being given respective weight values, each of the servers comprising:
a buffer for storing the cells of the class of the server;
a counter initially loaded with a full-count value corresponding to the weight value of the server; and
updating circuitry for updating the full-count value with an output value of the counter; and
a controller for successively causing each of the servers in a round-robin fashion to forward a cell from the buffer and decrement the counter by one if the output value of the counter is not decremented to a predetermined value, and resetting all of the servers at the end of a round robin sequence so that the counter in each of the servers is reloaded with the initial full-count value or the updated full-count value depending on the number of cells forwarded from the server, the updated full-count value being smaller than the weight value by an amount corresponding to a negative output value of the counter.

5. An ATM network node comprising:
a plurality of servers for respectively receiving cells of different service classes, the servers being given respective weight values, each of the servers comprising:
a buffer for storing the cells of the class of the server;
a counter initially loaded with a full-count value corresponding to the weight value of the server; and
updating circuitry for updating the full-count value with an output value of the counter; and
a controller for successively causing each of the servers in a round-robin fashion to forward a cell from the buffer and decrement the counter by one if the output value of the counter is not decremented to a predetermined value, and resetting all of the servers at the end of a round robin sequence so that the counter in each of the servers is reloaded with the initial full-count value or the updated full-count value depending on the number of cells forwarded from the server, the updated full-count value being respectively greater than the weight value by an amount corresponding to positive output of the counter but smaller than a predetermined upper limit value.

6. An ATM network node as claimed in claim 5, wherein the updated full-count value is smaller than the weight value by an amount corresponding to a negative output value of the counter.

7. An ATM network node comprising:
a plurality of servers for respectively receiving cells of different service classes, the servers being given respective weight values, each of the servers comprising:
a buffer for storing the cells of the class of the server;
a counter initially loaded with a full-count value corresponding to the weight value of the server; and
updating the circuitry for updating the full-count value with an output value of the counter; and
a controller for successively causing each of the servers in a round-robin fashion to forward a cell from the buffer and decrement the counter by one if the output value of the counter is not decremented to a predetermined value, and resetting all of the servers at the end of a round robin sequence so that the counter in each of the servers is reloaded with the initial full-count value or the updated full-count value depending on the number of cells forwarded from the server, wherein the controller is arranged to reset all the counters of the servers when all of the servers produce either a zero output count indication or a zero queue length indication, the zero output count indications indicating that the counter is decremented to zero and the zero queue length indication indicating that the buffer has no cell to transmit.

8. An ATM network node as claimed in claim 7, wherein the controller is further arranged to reset all the counters of the servers when all of said the servers produce a negative output count indication, the negative output count indication indicating that the counter is decremented to a negative value.

9. In an ATM network node comprising a plurality of buffers for respectively storing cells and a plurality of counters of different service classes respectively associated with buffers, the counters being initially loaded with respective full-count values corresponding to weight values of the service classes, a method comprising:
a) determining whether the output value of a successive one of the counters is not decremented to a predetermined count value;
b) if the counter is not decremented to a predetermined count value, causing the buffer associated with the counter to forward a cell and causing the counter to be decremented by one;
c) updating the full-count value with an output value of the one of the counters;
d) repeating the steps (a) to (c); and
e) reloading all of the counters with the initial full-count values or the updated full-count values at the end of a cycle depending on the number of cells forwarded from the buffer associated with the counter, the predetermined count value being a negative value, and step (c) being comprised of summing a negative output value of the counter with the initial weight.

10. In an ATM network node comprising a plurality of buffers for respectively storing cells and a plurality of counters of different service classes respectively associated with the buffers, the counters being initially loaded with respective full-count values corresponding to weight values of the service classes, a method comprising:
a) determining whether the output value of a successive one of the counters is not decremented to a predetermined count value;
b) if the counter is not decremented to a predetermined count value, causing the buffer associated with the counter to forward a cell and causing the counter to be decremented by one;

c) updating the full-count value with an output value of the one of the counters;

d) repeating the steps (a) to (c); and e) reloading all of the counters with the initial full-count values or the updated full-count values at the end of a cycle depending on the number of cells forwarded from the buffer associated with the counter, the predetermined count value being a zero count value, and step (c) being comprised of summing a positive output value of the counter with the initial full-count value.

11. In an ATM network node comprising a plurality of buffers for respectively storing cells and a plurality of counters of different service classes respectively associated with the buffers, the counters being initially loaded with respective full-count values corresponding to weight values of the service classes, a method comprising:

a) determining whether the output value of a successive one of the counters is not decremented to a predetermined count value;

b) if the counter is not decremented to a predetermined count value, causing the buffer associated with the counter to forward a cell and causing the counter to be decremented by one;

c) updating the full-count value with an output value of the one of the counters;

d) repeating the steps (a) to (c); and e) reloading all of the counters with the initial full-count values or the updated full-count values at the end of a cycle depending on the number of cells forwarded from the buffer associated with the counter, the predetermined count value being a negative value, and step (c) being comprised of summing a negative or positive output value of the counter with the initial full-count value.

12. In an ATM network node comprising a plurality of buffers for respectively storing cells, and a plurality of counters of different service classes respectively associated with the buffers, the counters being initially loaded with respective full-count values corresponding to weight values of the service cases, each of said counters producing a first indication when the counter is decremented to a predetermined value and each of said buffers producing a second indication when there is no cell to transmit, a method comprising the steps of:

a) setting a counter-pointing variable "i" to one;

b) making an affirmative decision when the counter pointed by variable "i" is producing said first indication or the buffer associated with the counter is producing said second indication or making a negative decision when both of the counter and the associated buffer are not producing the respective indications;

c) if the decision is at step (b) is negative, causing the associated buffer to forward a cell and decrementing the counter by one and updating the full-count value of the counter with an output value of the counter;

d) making an affirmative decision when, in each of said service classes, the counter is producing said first indication or the buffer is producing said second indication and making a negative decision when, in at least one of said service classes, both of the counter and the buffer are not producing the respective indication;

e) if the decision at step (d) is affirmative, reloading all of the counters with the initial full-count values or the updated full-count values of the counters depending on the number of cells forwarded from the buffers associated with the counters and repeating steps (a) to (d);

f) if the decision at step (d) is negative, incrementing the variable "i" by one and repeating steps (b) to (e); and g) if the decision at step (b) is affirmative, repeating steps (d) to (f).

13. The method of claim 12, wherein step (c) further comprises the step of resetting the variable "i" to zero.

14. An ATM network node comprising:

a plurality of buffers, each of which queues cells of different service classes;

a counter associated with each buffer;

a count updating circuit for each counter operative to store a service class weight value for the buffer associated with the counter and responsive to the service class weight value and to an output of the counter to provide an update value according to a first criterion; and a controller, the controller being operative to:

interrogate each of buffers and the associated counters in a round-robin sequence, beginning with a first buffer and an associated counter;

forward a queued cell from the interrogated buffer, alter the count in the associated counter by one, and then interrogate a next buffer and the associated counter in the sequence if a second criterion is not satisfied; and interrogate a next buffer and the associated counter in the sequence without forwarding a queued cell from the first buffer, and without altering the count in the associated counter, if the second criterion is satisfied;

repeat the interrogation of each of the buffers and the associated counters in turn according to the second criterion until each buffer has been interrogated, and thereafter, repeat the sequence of interrogations according to the second criterion beginning with the first buffer and the associated counter, the controller being further operative to activate all of the count updating circuits simultaneously when a third criterion based on the contents of the buffers and counters is satisfied.

15. An ATM node as described in claim 14, wherein, according to the first criterion, the update count value is equal to the service class weight value if the number of cells forwarded by the particular buffer does not exceed the number of cells represented by the service class weight value, and otherwise, the update count value is equal to the difference between the number of cells forwarded by the particular buffer and the service class weight value.

16. An ATM node as described in claim 14, wherein the second criterion is satisfied if there is no cell available to be forwarded in the buffer being interrogated or if the number of cells forwarded from the buffer being interrogated has exceeded a predetermined service limit, and is not satisfied otherwise.

17. An ATM node as described in claim 16, wherein, if the second criterion is not satisfied while the first buffer is being interrogated, the controller continues to interrogate the first buffer and the associated counter according to the second criterion until the second criterion is satisfied.

18. An ATM node as described in claim 14, wherein, if the second criterion is not satisfied while the first buffer is being interrogated, the controller continues to interrogate the first buffer and the associated counter according to the second criterion until the second criterion is satisfied.

19. An ATM node as described in claim 14, wherein the third criterion is satisfied if all of the buffers have forwarded at least the number of cells represented by their respective service class weight values, and no buffer has a queued cell available for forwarding.

20. An ATM network node comprising:
- a plurality of servers for respectively receiving cells of different classes, the servers being given respective weight values, each of the servers comprising:
- a buffer that queues cells of the service class corresponding to the server;
- a counter;
- a count updating circuit operative to store a service class weight value corresponding to the server, and responsive to the service class weight value and to an output of the counter to provide an update count value according to a first criterion; and
- a controller, the controller being operative to:
  - interrogate the buffer and the associated counter in each server in a round-robin sequence, beginning with a first server;
  - forward a queued cell from the interrogated server and alter the count in the associated counter by one, if a second criterion is not satisfied; and
  - interrogate a next server in the sequence without forwarding a queued cell from the first server and without altering the count in the associated counter, if the second criterion is satisfied;
  - repeat the interrogation of each of the servers in turn according to the second criterion until each server has been interrogated, and thereafter,
  - repeat the sequence of interrogations according to the second criterion beginning with the first server;
  - the controller being further operative to activate all of the count updating circuits simultaneously when a third criterion based on the contents of the buffers and counters is satisfied.

21. An ATM node as described in claim 20, wherein, according to the first criterion, the update count value is equal to the service class weight value if the number of cells forwarded by the particular server does not exceed the number of cells represented by the service class weight value, and otherwise, the update count value is equal to the difference between the number of cells forwarded by the particular server and the service class weight value.

22. An ATM node as described in claim 20, wherein the second criterion is satisfied if there is no cell available to be forwarded in the server being interrogated or if the number of cells forwarded by the server being interrogated has exceeded a predetermined service limit, and wherein the second criterion is not satisfied otherwise.

23. An ATM node as described in claim 22, wherein, if the second criterion is not satisfied while the first server is being interrogated, the controller continues to interrogate the first server according to the second criterion until the second criterion is satisfied.

24. An ATM node as described in claim 22, wherein, if the second criterion is not satisfied while the first server is being interrogated, the controller continues to interrogate the first server according to the second criterion until the second criterion is satisfied.

25. An ATM node as described in claim 23, wherein the third criterion is satisfied if all of the servers have forwarded at least the number of cells represented by their respective service class weight values, and no server has a queued cell available for forwarding.

26. A transmission control method for an ATM network node comprising a plurality of buffers, each of which queues cells of different service classes, a counter associated with each buffer and a count updating circuit for each counter that stores a service class weigh value for the buffer associated with the counter and provides an update count value according to a first criterion, the method comprising:
- interrogating each of buffers and the associated counters in a round-robin sequence, beginning with a first buffer and associated counter;
- forwarding a queued cell from the interrogated buffer, and altering the count in the associated counter by one, if a second criterion is not satisfied;
- interrogating a next buffer and the associated counter in the sequence without forwarding a queued cell from the first buffer, and without altering the count in the associated counter, if the second criterion is satisfied;
- repeating the interrogation of each of the buffers and the associated counters in turn according to the second criterion until each buffer has been interrogated, and thereafter,
- repeating the sequence of interrogations according to the second criterion beginning with the first buffer and the associated counter; and
- activating all of the count updating circuits simultaneously when a third criterion based on the contents of the buffers and counters is satisfied.

27. A method as described in claim 26, wherein, according to the first criterion, the update count value is equal to the service class weight value if the number of cells forwarded by the particular buffer does not exceed the number of cells represented by the service class weight value, and otherwise, the update count value is equal to the difference between the number of cells forwarded by the particular buffer and the service class weight value.

28. A method as described in claim 26, wherein the second criterion is satisfied if there is no cell available to be forwarded in the buffer being interrogated or if the number of cells forwarded by the buffer being interrogated has exceeded a predetermined service limit, and is not satisfied otherwise.

29. A method as described in claim 28, wherein, if the second criterion is not satisfied while the first buffer is being interrogated, the controller continues to interrogate the first buffer and the associated counter according to the second criterion until the second criterion is satisfied.

30. A method as described in claim 26, wherein, if the second criterion is not satisfied while the first buffer is being interrogated, the controller continues to interrogate the first buffer and the associated counter according to the second criterion until the second criterion is satisfied.

31. A method as described in claim 26, wherein the third criterion is satisfied if all of the buffers have forwarded at least the number of cells represented by their respective service class weight values, and no buffer has a queued cell available for forwarding.

* * * * *

UNITED STATES PATENT AND TRADEMARK OFFICE
CERTIFICATE OF CORRECTION

PATENT NO.    : 6,330,223 B1
DATED         : December 11, 2001
INVENTOR(S)   : Hideyuki Shimonishi It is certified that error appears in the above-identified patent and that said Letters Patent is hereby corrected as shown below:

<u>Title page, Item [54] and Column 1, lines 1-3,</u>
The title should read -- WEIGHTED ROUND-ROBBIN MULTIPLEXING OF ATM CELLS BY UPDATING WEIGHTS WITH COUNTER OUTPUTS --.

Signed and Sealed this

Second Day of July, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO. : 6,330,223 B1
DATED : December 11, 2001
INVENTOR(S) : Hideyuki Shimonishi It is certified that error appears in the above-identified patent and that said Letters Patent is hereby corrected as shown below:

<u>Title page,</u>
Item [54], Title should read as follows:

-- WEIGHTED ROUND-ROBBIN MULTIPLEXING OF ATM CELLS BY UPDATING COUNTER OUTPUTS --.

This certificate supersedes Certificate of Correction issued July 2, 2002.

Signed and Sealed this

Nineteenth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,330,223 B1
DATED         : December 11, 2001
INVENTOR(S)   : Shimonishi It is certified that error appears in the above-identified patent and that said Letters Patent is hereby corrected as shown below:

Title page, Item [54] and Column 1, lines 1-3,
The Title should read: -- WEIGHTED ROUND-ROBIN MULTIPLEXING OF ATM CELLS BY UPDATING WEIGHTS WITH COUNTER OUTPUTS --.

This certificate supersedes Certificate of Correction issued November 19, 2002.

Signed and Sealed this

First Day of April, 2003

JAMES E. ROGAN
*Director of the United States Patent and Trademark Office*